(12) United States Patent
Yamazaki et al.

(10) Patent No.: US 6,793,033 B2
(45) Date of Patent: Sep. 21, 2004

(54) COMPACT VEHICLE

(75) Inventors: Takeshi Yamazaki, Saitama (JP);
Takenori Yamamoto, Saitama (JP);
Norihiro Kurata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/392,961

(22) Filed: Mar. 21, 2003

(65) Prior Publication Data

US 2003/0230886 A1 Dec. 18, 2003

(30) Foreign Application Priority Data

Mar. 26, 2002 (JP) ........................................ 2002-085680

(51) Int. Cl.$^7$ ............................................. B60R 21/00
(52) U.S. Cl. ..................................................... 180/268
(58) Field of Search ................................ 180/268, 271, 180/282; 280/730.1, 730.2, 728.1, 801.1

(56) References Cited

U.S. PATENT DOCUMENTS

| | | | | |
|---|---|---|---|---|
| 4,984,651 A | * | 1/1991 | Grosch et al. | .............. 180/268 |
| 5,123,498 A | * | 6/1992 | Alcidi et al. | ................. 180/268 |
| 6,123,166 A | * | 9/2000 | Verellen | ...................... 180/268 |

FOREIGN PATENT DOCUMENTS

| | | | | |
|---|---|---|---|---|
| JP | 01317849 A | * | 12/1989 | ........... B60R/22/32 |
| JP | 8-239073 A | | 9/1996 | |
| JP | 2000198414 A | * | 7/2000 | ........... B60R/22/32 |
| JP | 2001-219884 A | | 8/2001 | |

* cited by examiner

Primary Examiner—David R. Dunn
Assistant Examiner—Faye M. Fleming
(74) Attorney, Agent, or Firm—Birch, Stewart, Kolasch & Birch, LLP

(57) ABSTRACT

A compact vehicle provided with a seat belt for constraining a rider to enhance impact absorption effect of an air bag, and releasing the seat belt when secondary motion is caused in relation to the vehicle body. The air bag constrains the rider on a seat from a forward direction when the air bag is inflated and extended. One end of a seat belt wound around the waist of the rider and is coupled to the vehicle body via a retractor provided with a locking function in emergency. A coupling means is provided in which coupling and uncoupling can be switched manually in a coupled state. In addition, coupling is automatically released after a predetermined period of time elapses subsequent to inflation of the air bag, thus releasing the other end of the seat belt from the vehicle body.

17 Claims, 6 Drawing Sheets

COMPACT VEHICLE

CROSS-REFERENCE TO RELATED APPLICATION

The present application claims priority under 35 U.S.C. §119 to Japanese Patent Application No. 2002-085680, filed Mar. 26, 2002, the entire contents of which are hereby incorporated by reference.

BACKGROUND OF THE INVENTION

1. Field of the Invention

The present invention relates to a compact vehicle having a seat provided at the rear of a vehicle body and an air bag that can constrain a rider on the seat from a forward direction when the air bag is inflated and extended.

2. Description of Background Art

Such a compact vehicle is disclosed in Japanese published unexamined patent application No. 2001-219884 for example.

To enhance impact absorption in a four-wheel vehicle, an inflated and extended air bag and a seat belt made tense by the action of impact are required to be used together. In a compact vehicle such as a motorcycle, it is considered that the effect of an air bag can be more enhanced by using a seat belt disclosed in Japanese published unexamined patent application No. Hei8-239073. However, in the compact vehicle such as a motorcycle, a secondary motion such as an overturn or a skid after collision may occur, thus causing a secondary collision. In this case, it is desirable that constraint by a seat belt is released.

SUMMARY AND OBJECTS OF THE INVENTION

The invention is made in view of such a situation. The object of the invention is to provide a compact vehicle which enhances the impact absorption effect by an air bag for a rider constrained by a seat belt. When a secondary motion is caused in relation to a body, the seat belt constraining the rider can be released.

To achieve the object, a first aspect of the present invention is based upon a compact vehicle having a seat provided to the rear of a body and an air bag that can constrain a rider on the seat from a forward direction when the air bag is inflated and extended. One end of a seat belt, which can be wound around the waist of the rider on the seat, is coupled to the vehicle body via a retractor provided with a locking function in emergency. Further, a coupling means is provided in which coupling and the release of coupling can be switched manually. In addition, when the air bag is inflated and extended between the other end of the seat belt and the body, the coupling is automatically released after a predetermined period of time elapses.

According to such a configuration, when the air bag is inflated and extended because of the collision of the compact vehicle, the rider is constrained by the seat belt made tense when the retractor is locked by keeping the coupling means in the coupled state by manual operation. In this situation, impact can be effectively relieved because the inflated and extended air bag receives the rider constrained by the seat belt. In addition, since the coupling of the coupling means is automatically released after a predetermined period of time elapses when the air bag is inflated and extended, the seat belt constraining the rider is released.

According to a second aspect of the invention, the coupling of the coupling means is released when an overturn detection sensor for detecting the overturn of the body detects the overturn. According to such a configuration, when the motorcycle individually overturns because of a cause other than a collision, and a skid or a secondary collision occurs, the constraint of the rider on the body is released.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
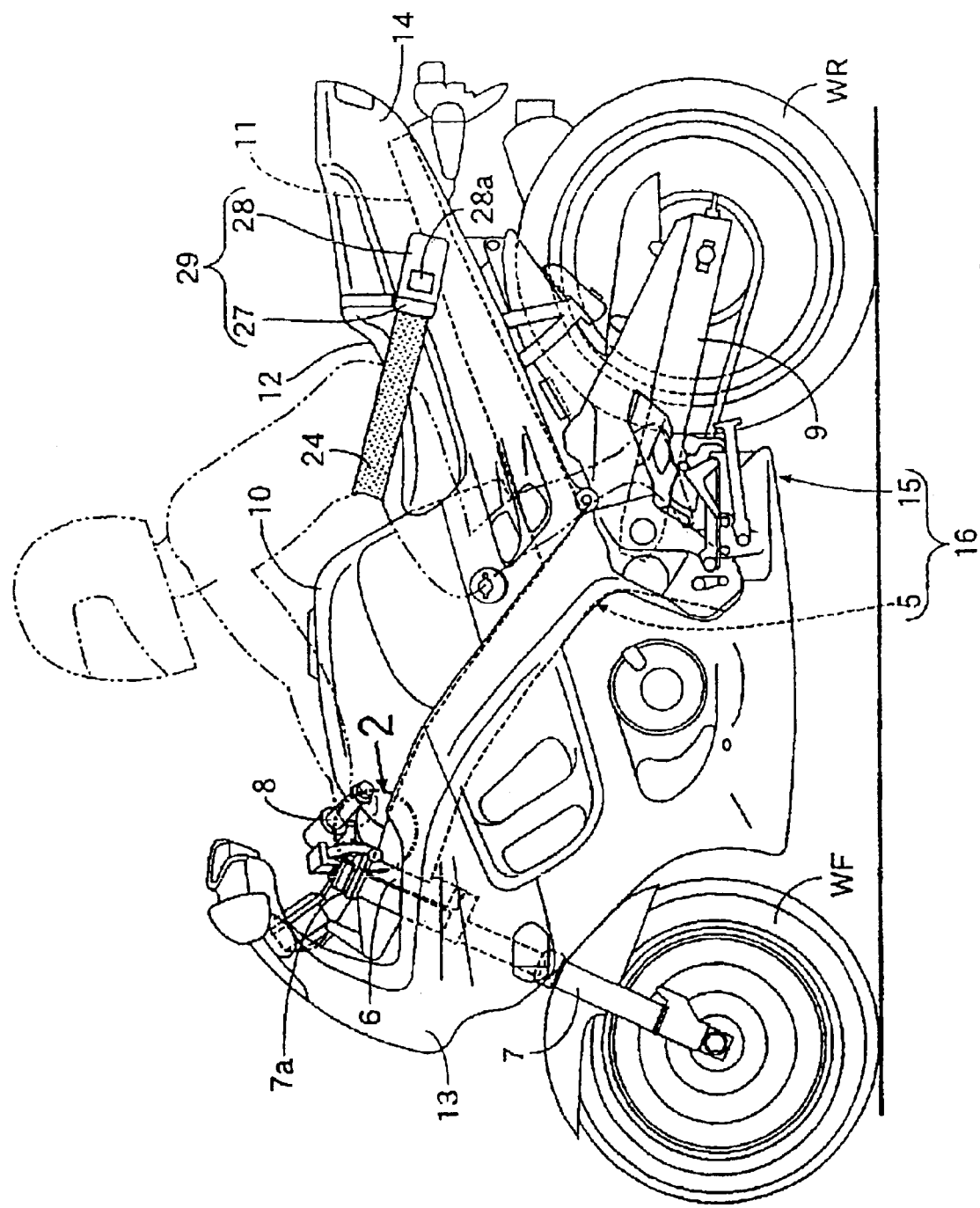
FIG. 1 is a side view showing a motorcycle equivalent to a first embodiment.

First, as shown in FIG. 1, a motorcycle includes a front fork 7 for supporting a front wheel WF, a head pipe 6, and a body frame 5. The front fork 7 can be steered using a steering handlebar 8 attached to a top bridge 7a provided on the upper side of the front fork 7. A swing arm 9 is supported by the rear of the body frame 5 so that the swing arm 9 can be vertically oscillated. A rear wheel WR is supported by the rear end of the swing arm 9.

A fuel tank 10 is mounted on a front half of the body frame 5. A tandem type seat 12 is arranged at the back of the fuel tank 10. A seat rail 11 is provided at a rear of the body frame 5.

Most of the body frame 5 is covered with a body cover 15 made of synthetic resin and forming a body 16 together with the body frame 5. The body cover 15 is composed of a front cowl 13 and a rear cowl 14.

Figure 2:
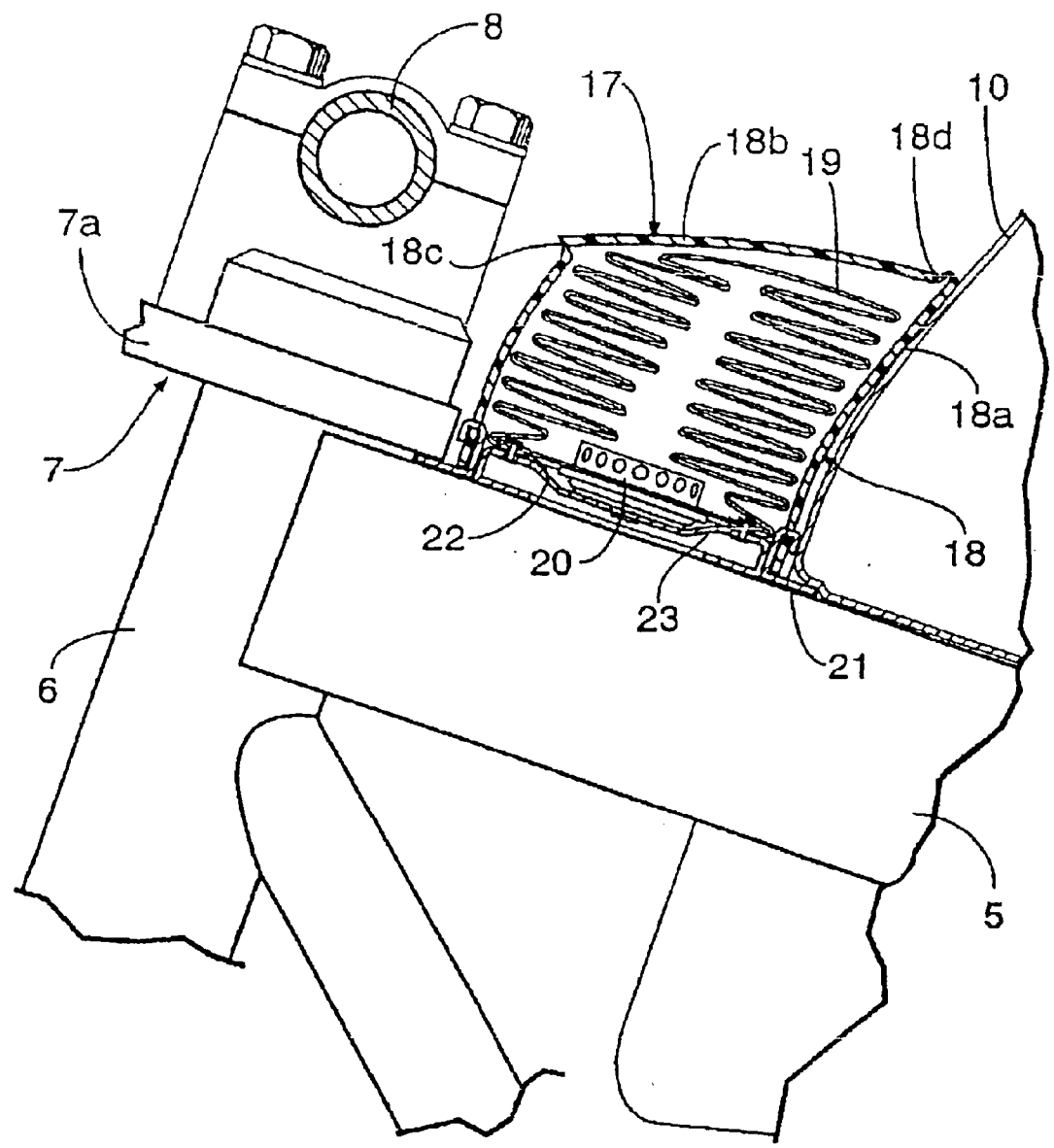
FIG. 2 is an enlarged longitudinal section viewed from direction shown by an arrow 2 in FIG. 1.

As shown in FIG. 2, an air bag module 17 is provided on the body frame 5 between the head pipe 6 and the fuel tank 10, for example. The air bag module 17 is provided with an air bag 19 housed in the air bag housing 18, and an inflator 20 that generates gas for inflating and extending the air bag 19.

The air bag housing 18, formed by light material made of synthetic resin, is provided with a housing barrel 18a that can house the air bag 19 in a folded state. A flap 18b closes an opening at the upper end of the housing barrel 18a like a cap. The lower side of the housing barrel 18a is attached to the body frame 5 by an attachment piece 21 fixed to the body frame 5.

The flap 18b is coupled to the housing barrel 18a via a hinge 18c arranged in one location around the flap 18b, for example in a location on the side opposite to the fuel tank 10. A weak part 18d is arranged in a part separate from the hinge 18c around the flap 18b, the weak part 18d being formed so that it can be easily burst.

An opening 22 of the air bag 19 is closed in a airtight manner by a connector 23 fixed to the attachment piece 21. The inflator 20 is attached to the inside of the connector 23.

A shock sensor (not shown), such as an acceleration sensor, is attached to the body frame 5. The inflator 20 is operated when the shock sensor detects shock equal to or exceeding a predetermined value, and supplies high-pressure gas into the air bag 19.

Figure 3:
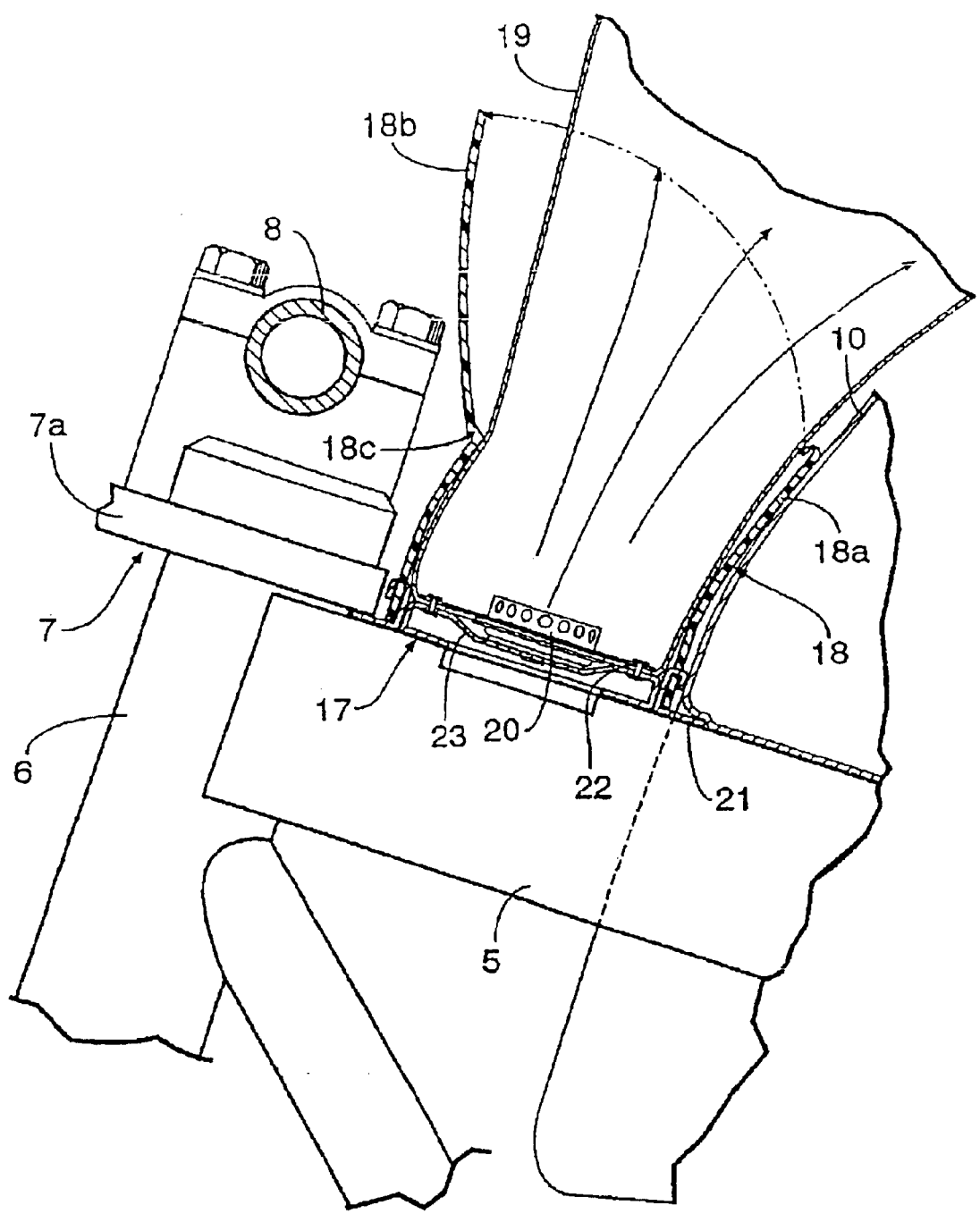
FIG. 3 is a sectional view corresponding to FIG. 2 when an air bag is inflated and extended.

When the high-pressure gas is supplied from the inflator 20, the air bag 19 bursts the weak part 18d of the air bag housing 18, momentarily inflates and extends upward, opening the flap 18b as shown in FIG. 3, and a rider seated on the seat 12 is constrained by the inflated and extended air bag 19 from a forward direction.

Figure 4:
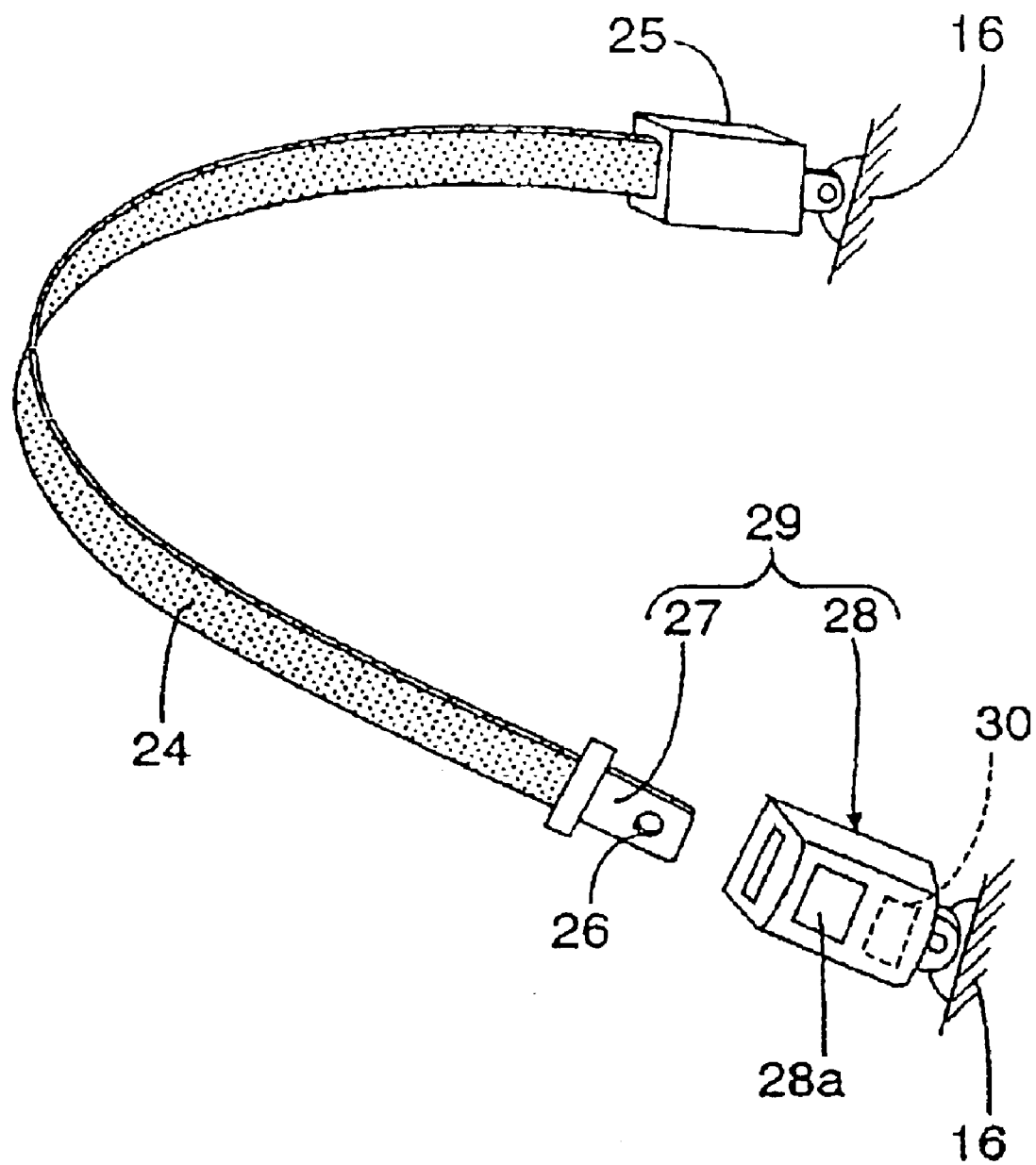
FIG. 4 shows the simple configuration of a seat belt.

The motorcycle is provided with seat belt 24 wound around the waist of the rider to constrain the rider on the seat 12 on the body 16. As shown in FIG. 4, one end of the seat belt 24 is coupled to the body 16 via a retractor 25 provided with a locking function in emergency set so that the retractor is turned to a locked state by the action of excessive impact caused by a collision or other abnormal sudden impact.

A tongue 27, provided with a fitting hole 26, is fixed to the other end of the seat belt 24. The tongue 27 and a buckle 28 form coupling means 29 to fasten the other end the seat belt 24 and the body 16 together on the side of the body 16. The coupling of the seat belt 24 to the body 16 occurs when the side of the buckle 28 is fitted to the fitting hole 26 by inserting the tongue 27 into the buckle 28. The fitting of the side of the buckle 28 to the fitting hole 26 is released by pressing an operating part 28a of the buckle 28, thus releasing the end of the seat belt 24 from the body 16. In other words, the coupling means 29 couples and releases the end of the seat belt 24 and the body 16 by a manual operation.

In addition, an actuator 30 is provided on the side of the buckle 28 of the coupling means 29. The actuator 30 provides for releasing the coupling means 29 without manual operation, and is actuated when a predetermined period of time elapses after the air bag 19 has inflated and has been extended in the coupled state. For example, in the preferred embodiment, the predetermined period of time is approximately 0.5 seconds. In other words, the actuator 30 is actuated approximately 0.5 seconds after the inflator 20 has actuated the air bag, at which time the coupling of the coupling means 29 is released automatically.

Next is an explanation of the action of the first embodiment. One end of the seat belt 24 that is wound around the waist of the rider on the seat 12 is coupled to the body 16 via the retractor 25, which is provided with the locking function in emergency. The coupling means 29 provides for coupling and releasing of the other end of the belt on a manual basis. Following a sudden impact in which the air bag 19 is inflated, the coupling on the other end of the seat belt 24 is automatically released from the body 16 after a predetermined period of time (for example, 0.5 seconds) elapses.

Therefore, since the retractor 25 is locked by keeping the coupling means 29 in the coupled state by manual operation when the air bag 19 is inflated and extended by the collision or abnormal impact of the motorcycle, the rider is constrained by the seat belt 24 made tense when the retractor is locked. Thus, the rider is received by the inflated and extended air bag 19, and impact can be effectively relieved.

Figure 5:
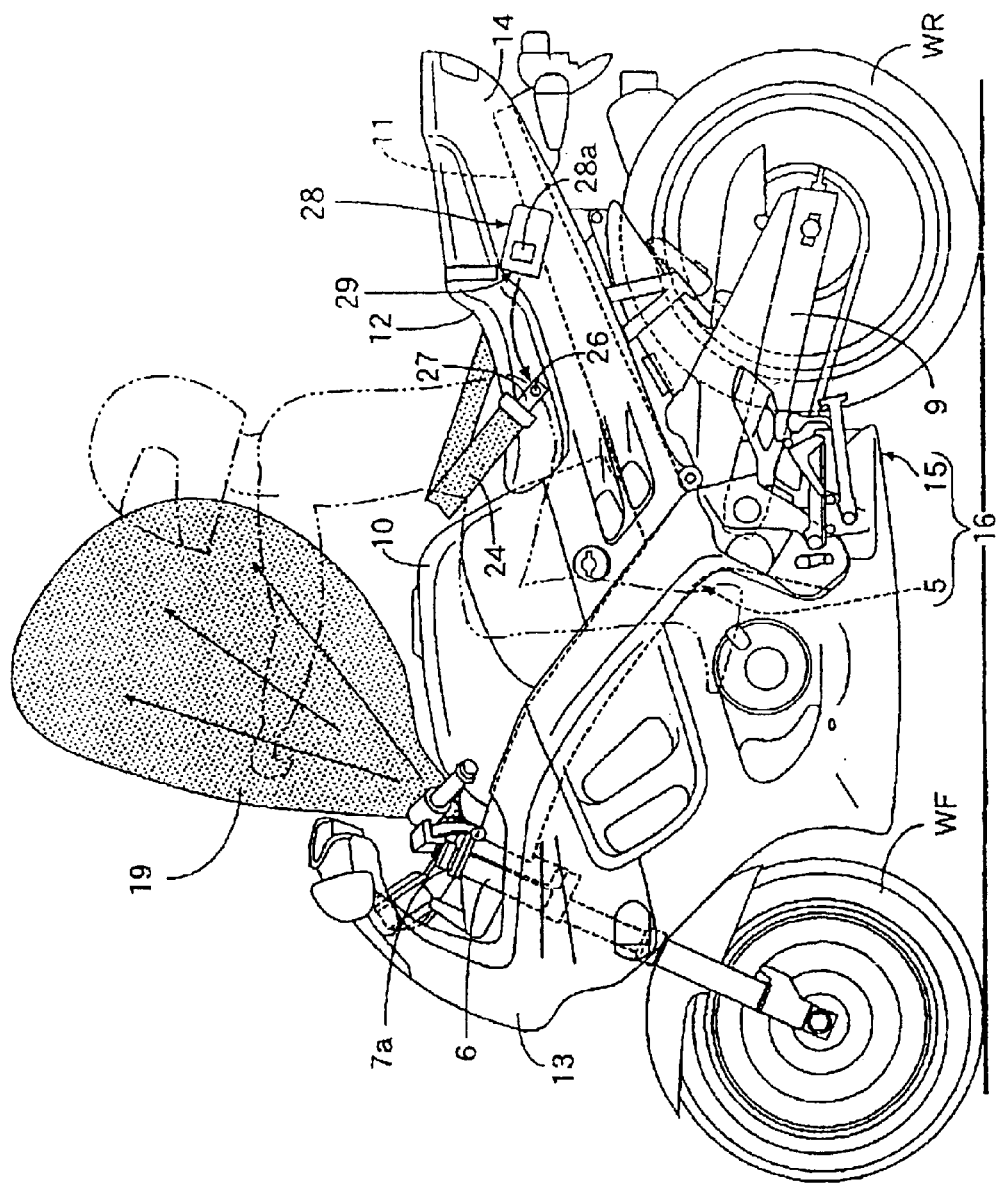
FIG. 5 is a side view showing the motorcycle in a state in which predetermined time elapses after the air bag is inflated and extended.

On the other hand, since the coupling means 29 automatically releases coupling, as shown in FIG. 5, and the tongue 27 withdraws from the buckle 28 after a predetermined period of time elapses subsequent to the inflation of the air bag 19, the seat belt 24 automatically releases, thus freeing the rider.

Figure 6:
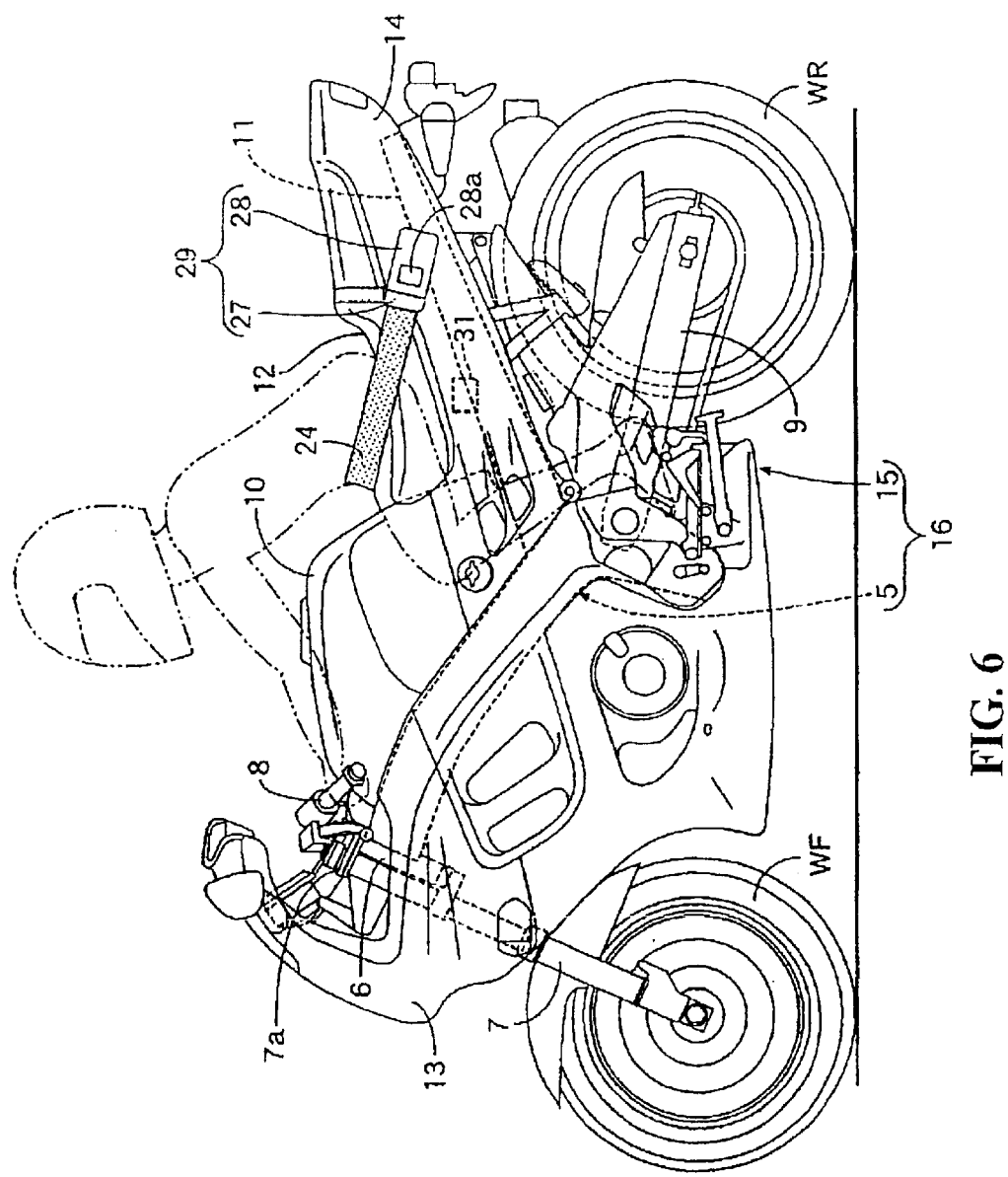
FIG. 6 is a side view showing a motorcycle equivalent to a second embodiment.

FIG. 6 shows a second embodiment of the invention. The same reference numbers are allocated to parts corresponding to that in the first embodiment.

For example, an overturn detection sensor 31 formed by an inclination sensor or a lateral acceleration sensor is attached to the center in a direction of the width of the body 16 under the seat 12. The overturn detection sensor 31 detects an overturn condition of the vehicle. In addition, the coupling means 29 is configured so that it releases coupling when the overturn detection sensor 31 detects the overturn.

According to the second embodiment, when the motorcycle individually overturns as the result of a skid or a secondary collision, the constraint of the rider on the body 16 can be released.

The invention can be widely applied not only to the motorcycle described in the embodiments, but to a compact vehicle such as a scooter-type motorcycle and a three-wheeled vehicle.

The embodiments of the invention have been described, however, the invention is not limited to the embodiments and various design changes without deviating from the invention described in the scope are allowed.

As described above, according to the first aspect of the present invention, the inflated and extended air bag receives the rider constrained by the seat belt, and impact can be effectively relieved. This is accomplished by keeping the coupling means in the coupled state by manual operation during normal traveling conditions. Then, when a secondary motion is caused in relation to the vehicle body, the constraint of the rider on the vehicle body can be released.

In addition, according to the second aspect of the present invention, when the motorcycle overturns because of a skid or because of a secondary collision, the constraint of the rider on the body can be released.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A compact vehicle, comprising:
   a seat provided at a rear of a vehicle body;
   an air bag provided at a front of the vehicle body, the air bag for constraining a rider on the seat from a forward direction when the air bag is inflated and extended; and
   a seat belt that can be wound around a waist of the rider on the seat, the seat belt including:
      one end of the seat belt coupled to the vehicle body via a retractor provided with a locking function in emergency;
      an opposite end of the seat belt; and
   coupling means on said opposite end of the seat belt for manually coupling and releasing of a coupling, and when the seat belt is in a coupled state, the coupling means automatically releases the coupling after a predetermined period of time has elapsed subsequent to inflation and extension of the air bag in order to automatically release the opposite end of said seat belt from the vehicle body.

2. A compact vehicle according to claim 1, wherein:
the coupling means releases coupling when an overturn detection sensor for detecting an overturn of the vehicle body detects the overturn.

3. A compact vehicle according to claim 1, further comprising an actuator provided on a side of a buckle of the coupling means, the actuator providing for releasing the coupling means without manual operation.

4. A compact vehicle according to claim 3, wherein the actuator is actuated approximately 0.5 seconds after an inflator has actuated the air bag, at which time the coupling of the coupling means is released automatically.

5. A compact vehicle according to claim 1, wherein the coupling means includes a tongue on said opposite end of the seat belt and a buckle attached to the vehicle body, and wherein coupling of the seat belt to the vehicle body occurs when the side of the buckle is fitted to a fitting hole of the tongue by inserting the tongue into the buckle.

6. A compact vehicle according to claim 5, wherein the buckle includes an operating part for releasing said opposite end of the seat belt from the vehicle body.

7. A compact vehicle according to claim 6, wherein the operating part is manually pressable for manually releasing said opposite end of the seat belt from the vehicle body.

8. A compact vehicle according to claim 2, wherein the overturn detection sensor is an inclination sensor or a lateral acceleration sensor attached to a center in a direction of the width of the vehicle body under the seat.

9. A compact vehicle, comprising:
a seat provided at a rear of a vehicle body;
an air bag provided at a front of the vehicle body, the air bag for constraining a rider on the seat from a forward direction when the air bag is inflated and extended; and
a seat belt that can be wound around a waist of the rider on the seat, the seat belt including:
one end of the seat belt coupled to the vehicle body via a retractor provided with a locking function in emergency; and
an opposite end of the seat belt capable of being coupled to the vehicle body; and
an actuator attached to the vehicle body for automatically releasing the opposite end of the seat belt from the vehicle body after a predetermined period of time has elapsed once the air bag has been inflated and extended.

10. A compact vehicle according to claim 9, wherein:
the actuator releases the opposite end of the seat belt from the vehicle body when an overturn detection sensor for detecting an overturn of the vehicle body detects the overturn.

11. A compact vehicle according to claim 9, further comprising a buckle on the vehicle body, wherein the actuator is provided on a side of the buckle, the actuator providing for releasing the opposite end of the seat belt from the vehicle body without manual operation.

12. A compact vehicle according to claim 11, wherein the actuator is actuated approximately 0.5 seconds after an inflator has actuated the air bag, at which time the opposite end of the seat belt released automatically from the vehicle body.

13. A compact vehicle according to claim 9, further comprising a buckle attached to the vehicle body,
wherein the opposite end of the seat belt includes a tongue, and
wherein the opposite end of the seat belt couples to the vehicle body when a side of the buckle is fitted to a fitting hole of the tongue by inserting the tongue into the buckle.

14. A compact vehicle according to claim 13, wherein the buckle includes an operating part for releasing said opposite end of the seat belt from the vehicle body.

15. A compact vehicle according to claim 14, wherein the operating part is manually pressable for manually releasing said opposite end of the seat belt from the vehicle body.

16. A compact vehicle according to claim 13, wherein the buckle is hingedly attached to the vehicle body.

17. A compact vehicle according to claim 10, wherein the overturn detection sensor is an inclination sensor or a lateral acceleration sensor attached to a center in a direction of the width of the vehicle body under the seat.

* * * * *